L. TROTH.
INSECT TRAPPING AND CREMATING DEVICE.
APPLICATION FILED APR. 30, 1912.
1,037,688.
Patented Sept. 3, 1912.
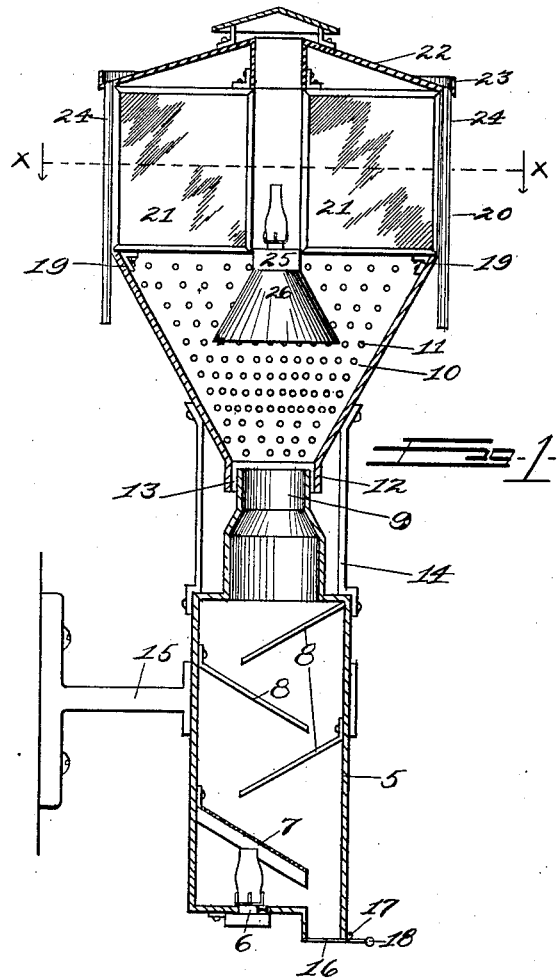
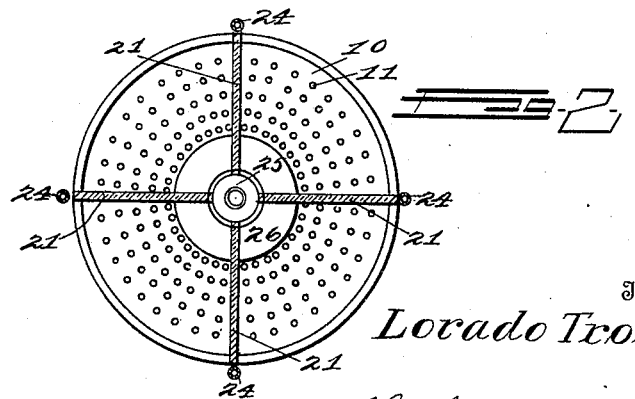
Witnesses
J. M. Lyles.
C. S. Schmidt.
Inventor
Lorado Troth,
By Shepherd & Campbell
Attorneys

UNITED STATES PATENT OFFICE.

LORADO TROTH, OF SAN DIEGO, CALIFORNIA.

INSECT TRAPPING AND CREMATING DEVICE.

1,037,688.  Specification of Letters Patent.  Patented Sept. 3, 1912.

Application filed April 30, 1912. Serial No. 694,060.

*To all whom it may concern:*

Be it known that I, LORADO TROTH, a citizen of the United States of America, residing at San Diego, in the county of San Diego and State of California, have invented certain new and useful Improvements in Insect Trapping and Cremating Devices, of which the following is a specification.

This invention relates to an insect trapping and cremating device, and it has for its object, the provision of a device of this character adapted to attract, trap and cremate winged insects of various kinds.

Further objects and advantages of the invention will be set forth in the detailed description which now follows.

In the accompanying drawing, Figure 1 is a vertical sectional view of an insect trapping and cremating device, constructed in accordance with the invention, and Fig. 2 is a horizontal sectional view therethrough upon line X—X of Fig. 1.

Like numerals designate corresponding parts in all of the figures of the drawing.

Referring to the drawing, the numeral 5 designates the casing of the cremator, and 6 designates a lamp for furnishing the heat necessary to cremate the insects. This lamp is disposed beneath a perforate screen 7. Deflectors 8 are located within the body 5 and serve a purpose hereinafter described. The products of combustion from lamp 6 pass upwardly through a chimney extension 9 and into a flaring or funnel like body 10, the walls of which are perforate, as at 11. At its lower end the body 10 is provided with a neck extension 12 which surrounds the upper portion of the chimney 9, but is spaced therefrom to leave an opening 13. The body 10 is supported by brackets 14 from the body 5 and if desired, an additional bracket 15 may be employed for supporting the entire structure from a wall, though this latter is not essential.

For discharging the cremated insects from the body 5, a trap door 16 is pivoted at 17 and is provided with a weight 18, so that when a sufficient number of insects have been collected, the trap door will tilt to discharge them. Supported by brackets 19 from the body 10 are frames 20, within which transparent panes 21 of glass, or like material, are mounted. These frames also support a top 22. This top 22 is provided with an upstanding rim 23, which directs rain water to spouts 24. The insect attracting lamp 25 is disposed centrally with relation to the panes, and at its bottom carries a deflector 26 which prevents rain from passing directly downward through chimney 9 to the cremator. Upon the contrary, such rain passes downwardly and strikes the deflector 26 and is directed outwardly against the walls of the body 10. The majority of it passes through the perforations of this body, but such of the rain as does not pass out of the perforations, is discharged through opening 13.

The operation of the device is as follows. Winged insects of various kinds are attracted by the light of lamp 25, and as they try to fly about said lamp, they strike against the transparent panes 21 and are so disabled that they fall into the hopper like body 10, from whence they are discharged through chimney 9 into the cremator 5, passing back and forth over the inclined deflectors 8 until they land upon the perforated screen 7 where they are finally consumed.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview, such changes as may be made within the scope of the appended claims.

Having described my invention, what I claim is:—

1. In a device of the character described, the combination with a light producing element, of a plurality of transparent panes supported therearound, a hopper located therebeneath, a cremator body supported beneath said hopper, a perforated screen in said cremator body, and a heat producing element beneath said screen.

2. In a device of the character described, the combination with a light producing element, of a plurality of transparent panes supported therearound, a hopper located therebeneath, a cremator body supported beneath said hopper, a perforated screen in said cremator body, a heat producing element beneath said screen, and a trap door upon which said screen discharges.

3. In a device of the character described, the combination with a light producing element, of a plurality of transparent panes supported therearound, a hopper located therebeneath, a cremator body supported beneath said hopper, a perforated screen in said cremator body, a heat producing element beneath said screen, and a counter-balanced trap door upon which said screen discharges.

4. In a device of the character described, the combination with a cremator body comprising an open top, a plurality of alternating oppositely inclined deflectors, a perforated screen upon which the lowermost of said deflectors discharge, a heat producing element beneath said screen, a light producing element, and vertical, radially disposed, transparent panes disposed about said light producing element.

5. In a device of the character described, the combination with a light producing element, of an outwardly and downwardly flaring deflector, an outwardly and upwardly flaring hopper in which said deflector is located, a plurality of transparent panes radially disposed about the light producing element, a cover for excluding rain disposed above said panes and said light producing element, and a cremator body having an upper neck extension, which enters, but is spaced from, the lower end of the hopper.

In testimony whereof I affix my signature in presence of two witnesses.

LORADO TROTH.

Witnesses:
G. U. FRY,
J. C. HIZAR.

Copies of this patent may be obtained for five cents each, by addressing the "Commissioner of Patents, Washington, D. C."